United States Patent
Markosyan

(10) Patent No.: US 8,501,261 B2
(45) Date of Patent: Aug. 6, 2013

(54) HIGH-PURITY REBAUDIOSIDE C AND PROCESS FOR PURIFICATION OF THE SAME

(75) Inventor: Avetik Markosyan, Kuala Lumpur (MY)

(73) Assignee: PureCircle Sdn Bhd, Kuala Lumpur (MY)

( * ) Notice: Subject to any disclaimer, the term of this patent is extended or adjusted under 35 U.S.C. 154(b) by 122 days.

(21) Appl. No.: 13/110,010

(22) Filed: May 18, 2011

(65) Prior Publication Data

US 2011/0287164 A1   Nov. 24, 2011

Related U.S. Application Data

(60) Provisional application No. 61/346,911, filed on May 21, 2010.

(51) Int. Cl.
*A23L 1/236* (2006.01)

(52) U.S. Cl.
USPC .......................................... 426/548; 426/425

(58) Field of Classification Search
USPC ........................................ 426/425, 431, 658
See application file for complete search history.

(56) References Cited

U.S. PATENT DOCUMENTS

| 4,353,889 A | 10/1982 | DuBois | |
|---|---|---|---|
| 2006/0134292 A1* | 6/2006 | Abelyan et al. | 426/548 |
| 2007/0082102 A1* | 4/2007 | Magomet et al. | 426/548 |

FOREIGN PATENT DOCUMENTS

CN           101628924 A   *   1/2010

OTHER PUBLICATIONS

Kobayashi, M., Horikawa, S., Dergandi, I.H., Ueno, J., and Mitsuhashi, H. Dulcoside A and B, New diterpene glycosides from *Stevia rebaudiana*. Phytochemistry. 1977. V.16. 1405-1408.
Sakamoto I., Yamasaki K., and Tanaka O. Application of 13C NMR Spectroscopy to Chemistry of Natural Glycosides: Rebaudioside-C, a New Sweet Diterpene Glycoside of *Stevia rebaudiana*. Chem. Pharm. Bull. 1977. V.25(4). 844-846.

* cited by examiner

*Primary Examiner* — Jyoti Chawla
(74) *Attorney, Agent, or Firm* — Pyprus pte Ltd

(57) ABSTRACT

The invention provides a process of purifying Rebaudioside C from the *Stevia rebaudiana* Bertoni plant extract along with Rebaudioside A and Stevioside. The process is useful for producing high purity Rebaudioside C, Stevioside and Rebaudioside A. High purity rebaudioside C is useful as in combination with other caloric and non-caloric sweeteners as well as non caloric sweetener in various food and beverage compositions. The high purity Rebaudioside A and Stevioside are useful as non-caloric sweeteners in edible and chewable compositions such as any beverages, confectioneries, bakeries, cookies, chewing gums, and alike.

17 Claims, No Drawings

HIGH-PURITY REBAUDIOSIDE C AND PROCESS FOR PURIFICATION OF THE SAME

RELATED APPLICATION

This application claims the benefit under 35 U.S.C. 119(e) of U.S. Provisional Application Ser. No. 61/346,911 titled with "HIGH-PURITY REBAUDIOSIDE C", filed May 21, 2010, which is herein incorporated by reference.

FIELD OF THE INVENTION

The invention relates to a process for isolation and purification of individual sweet glycosides of Stevia rebaudiana Bertoni, and more particularly to a process for isolation and purification of Rebaudioside C from Stevia rebaudiana Bertoni plant extract.

BACKGROUND OF THE INVENTION

High intensity sweeteners possess sweetness level many times exceeding that of sucrose. They are essentially non-calorie and used widely in manufacturing of diet and calorie-reduced food. Although natural caloric sweetener such as sucrose, fructose, and glucose provide the most desirable taste to consumers, they are caloric. High intensity sweeteners do not affect the blood glucose level and provide little or no nutritive value.

However, high intensity sweeteners that generally are used as sucrose substitutes possess taste characteristics different than that of sugar, such as sweet taste with different temporal profile, maximal response, flavor profile, mouthfeel, and/or adaptation behavior than that of sugar. For example, the sweet taste of some high-potency sweeteners is slower in onset and longer in duration than that of sugar and thus changes the taste balance of a food composition. Because of these differences, usage of high-potency sweetener in replacing such a bulk sweetener as sugar in a food or beverage causes disbalance in temporal and/or flavor profile. If the taste profile of high-potency sweeteners could be modified to impart desired taste characteristics, it can provide low calorie beverages and food products with taste characteristics more desirable for consumers.

On the other hand, high-potency sweeteners may have some cost and functional advantages compared to sugar. The competition among sugar and non-sugar high-potency sweeteners is tough in soft drinks industry, in countries where their use and production is permitted and also in countries with overvalued sugar prices.

At present high intensity sweeteners are used worldwide. They can be of both synthetic and natural origin.

Non-limiting examples of synthetic sweeteners include sucralose, potassium acesulfame, aspartame, alitame, saccharin, neohesperidin dihydrochalcone synthetic derivatives, cyclamate, neotame, dulcin, suosan, N—[N-[3-(3-hydroxy-4-methoxyphenyl)propyl]-L-α-aspartyl]-L-phenylalanine 1-methyl ester, N—[N-[3-(3-hydroxy-4-methoxyphenyl)-3-methylbutyl]-L-α-aspartyl]-L-phenylalanine 1-methyl ester, N—[N-[3-(3-methoxy-4-hydroxyphenyl)propyl]-L-α-aspartyl]-L-phenylalanine 1-methyl ester, salts thereof, and the like.

Non-limiting examples of natural high intensity sweeteners include Stevioside, Rebaudioside A, Rebaudioside B, Rebaudioside C, Rebaudioside E, Rebaudioside Steviolbioside, Dulcoside A, Rubusoside, mogrosides, brazzein, neohesperidin dihydrochalcone (NHDC), glycyrrhizic acid and its salts, thaumatin, perillartine, pernandulein, niukuroziosides, baiyunoside, phlomisoside-I, dimethyl-hexahydrofluorene-dicarboxylic acid, abrusosides, periandrin, carnosiflosides, cyclocarioside, pterocaryosides, polypodoside A, brazilin, hernandulcin, phillodulcin, glycyphyllin, phlorizin, trilobtain, dihydroflavonol, dihydroquercetin-3-acetate, neoastilibin, trans-cinnamaldehyde, monatin and its salts, selligueain A, hematoxylin, monellin, osladin, pterocaryoside A, pterocaryoside B, mabinlin, pentadin, miraculin, curculin, neoculin, chlorogenic acid, cynarin, siamenoside and others.

At present about eleven high intensity sweeteners are used worldwide. These are acesulfame-K, alitame, aspartame, cyclamate, glycyrrhizin, NHDC, saccharin, Stevioside, sucralose, thaumatin, neotame, and Rebaudioside A.

The standard sweetening power associated with each high intensity sweetener is given in TABLE 1. However, when they are used in blends, the sweetening power can change significantly.

TABLE 1

| Sweetener | Sweetness power |
| --- | --- |
| Saccharose | 1 |
| Acesulfame-K | 200 |
| Alitame | 2000 |
| Aspartame | 200 |
| Cyclamate | 30 |
| Glycyrrhizin | 50 |
| NHDC | 1000 |
| Saccharine | 300 |
| Stevioside | 200 |
| Rebaudioside A | 450 |
| Thaumatin | 3000 |
| Sucralose | 600 |

On the other hand, 'natural' and 'organic' foods and beverages have become the "hottest area" in the food industry. The combination of consumers' desire, advances in food technology, new studies linking diet to disease and disease prevention has created an unprecedented opportunity to address public health through diet and lifestyle.

A growing number of consumers perceive the ability to control their health by enhancing their current health and/or hedging against future diseases. This creates a demand for food products with enhanced characteristics and associated health benefits, specifically a food and consumer market trend towards "whole health solutions" lifestyle. The term "natural" is highly emotive in the world of sweeteners and has been identified as one of key trust, along with "whole grains", "heart-healthy" and "low-sodium". 'Natural' term is closely related to 'healthier'.

In this respect, natural high intensity sweeteners can have better commercial potential.

Stevia rebaudiana Bertoni is a perennial shrub of the Asteraceae (Compositae) family native to certain regions of South America. The leaves of the plant contain from 10 to 20% of diterpene glycosides, which are around 150 to 450 times sweeter than sugar. The leaves have been traditionally used for hundreds of years in Paraguay and Brazil to sweeten local teas and medicines.

At present there are more than 230 Stevia species with significant sweetening properties. The plant has been successfully grown under a wide range of conditions from its native subtropics to the cold northern latitudes.

Steviol glycosides have zero calories and can be used wherever sugar is used. They are ideal for diabetic and low calorie diets. In addition, the sweet steviol glycosides possess functional and sensory properties superior to those of many high potency sweeteners.

The extract of *Stevia rebaudiana* plant contains a mixture of different sweet diterpene glycosides, which have a single base—steviol and differ by the presence of carbohydrate residues at positions C13 and C19. These glycosides accumulate in *Stevia* leaves and compose approximately 10%-20% of the total dry weight. Typically, on a dry weight basis, the four major glycosides found in the leaves of *Stevia* are Dulcoside A (0.3%), Rebaudioside C (0.6-1.0%), Rebaudioside A (3.8%) and Stevioside (9.1%). Other glycosides identified in *Stevia* extract include Rebaudioside B, D, E, and F, Steviolbioside and Rubusoside. Among steviol glycosides only Stevioside and Rebaudioside A are available in commercial scale.

The physical and sensory properties are well studied only for Stevioside and Rebaudioside A. The sweetness potency of Stevioside is around 210 times higher than sucrose, Rebaudioside A in between 200 and 400 times.

Generally production of extract includes extraction of plant material with water or water-organic solvent mixture, precipitation of high molecular weight substances, deionization, and decolorization, purification on specific macroporous polymeric adsorbents, concentration and drying.

Purification techniques include re-crystallization from various organic solvents as well as chromatographic separation. As a result, besides the highly purified steviol glycosides, substantial amount of by products with 65-75% steviol glycosides content is being generated. The amount of such "non-food grade" materials often exceeds the "main" product 2-3 times and there is a certain economic demand for re-processing of these "by-products". This possesses big technical challenge as the majority of existing commercial purification processes fail to deliver satisfactory results with initial materials containing as low as 65-75% total steviol glycosides.

On the other hand commercial preparations of steviol glycosides such as *Stevia* Extract, Rebaudioside A possess certain drawbacks substantially limiting their usage in mainstream products.

One of these disadvantages is "so-called" limited maximal response value. This is the maximal sweetness in sugar equivalents achievable by using a high intensity sweetener regardless how high the concentration of the sweetener is. For steviol glycosides this value is approx. 6-8%. This means when used "as-is" steviol glycosides cannot deliver sweetness feeling which is higher than that of 6-8% sucrose solution. Considering that majority of soft drinks contain 10-13% sucrose the usage of steviol glycosides for full sugar substitution is not possible.

It has to be noted that high intensity sweeteners' taste profile is highly dependant on the concentration and usually the higher the concentration the higher the sensation of undesirable taste components such as bitterness, licorice, lingering aftertaste. This phenomenon limits the usage of steviol glycosides further to 4-5% sucrose equivalents in order to achieve pleasant taste of a food or beverage sweetened with *stevia* sweeteners.

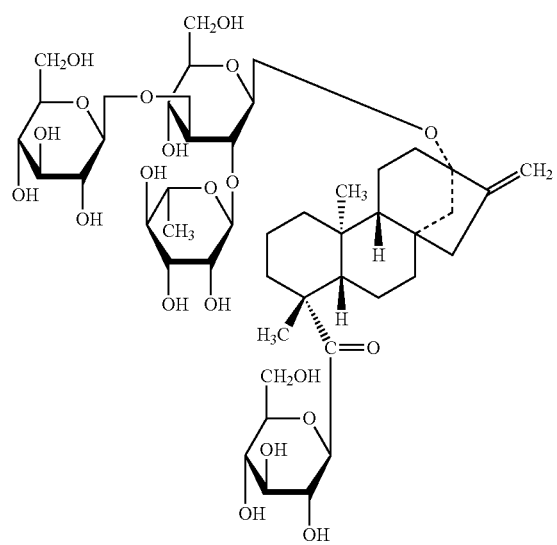

Rebaudioside C(CAS No: 63550-99-2), also known as Dulcoside B, is the third most abundant sweet glycoside found in *Stevia rebaudiana*. Nevertheless its isolation and purification are one of the most challenging compared to other glycosides. Few descriptions exist in literature of processes yielding high purity Rebaudioside C.

However recent studies show that highly purified forms of Rebaudioside C possess certain valuable properties. Particularly Rebaudioside C is capable to deliver flavor and sweetness enhancing properties.

These properties multiply the significance of Rebaudioside C and attract great interest for processes of preparation of highly purified forms of Rebaudioside C.

There are few processes described in the prior arts for Rebaudioside C preparation.

U.S. Pat. No. 4,353,889 describes a process of preparation of a substance referred as "Rebaudioside C". According to the embodiment of the patent, Rebaudioside A is refluxed with strong base in aqueous methanol medium at elevated temperature. Upon completion of the reaction the mixture is cooled and acidified with sulfuric acid to yield the base hydrolysis product called "Rebaudioside C" with 99% purity. It has to be noted that the chemical formula of the compound given in the patent actually corresponds to substance currently known to art as Rebaudioside B (CAS No: 58543-17-2).

*Stevia rebaudiana* aqueous extract was re-crystallized from methanol-ethanol mixture and Rebaudioside C was recovered from obtained mixture by chromatography on silica gel (Kobayashi et al., 1977). The process employs chromatographic separation which is not suitable for application in commercial scale.

*Stevia rebaudiana* methanolic extract was re-crystallized from methanol and Rebaudioside C was recovered from obtained mother liquor by chromatography on silica gel (Sakamoto et al., 1977). Using chromatographic separation stage in process makes it difficult to apply in commercial scale.

Most of the existing processes of highly purified Rebaudioside C preparation employ techniques which are only applicable for laboratory or pilot scale production.

However, there is no published data on the commercial isolation and purification of Rebaudioside C.

Hence, there is a need for a simple, efficient, and economical process for production of high purity Rebaudioside C.

Also there's a need for commercial re-processing process for low purity by products obtained after purification of steviol glycosides from raw extract.

SUMMARY OF THE INVENTION

The invention relates to a process for isolation and purification of individual sweet glycosides from *Stevia rebaudiana* Bertoni plant, and more particularly to a process for isolation and purification of Rebaudioside C.

The primary objective of the invention is to develop an efficient process of isolating and purifying different steviol glycosides particularly Rebaudioside C from *Stevia* extract.

The present invention provides a process for complete retreatment of *Stevia rebaudiana* Bertoni plant extract with isolation and purification of highly purified individual sweet glycosides, particularly Rebaudioside C.

According to the present invention the isolation and purification of Rebaudioside C was developed from *Stevia* extract.

One aspect of the present invention provides a process for purifying Rebaudioside C from *Stevia* extract. In one embodiment, the process comprises steps of:

a. providing an extract of *Stevia rebaudiana Bertoni* plant;
b. dissolving the extract in a first aqueous alcoholic solution to obtain a first mixture;
c. inducing crystallization in the first mixture;
d. filtering the first mixture to obtain a first precipitate and a first filtrate;
e. drying the first filtrate;
f. dissolving the dried first filtrate in a second aqueous alcoholic solution to obtain a second mixture;
g. inducing crystallization in the second mixture;
h. filtering the second mixture to obtain a second precipitate and a second filtrate;
i. adding a third aqueous alcoholic solution into the second filtrate to obtain a third mixture;
j. inducing crystallization in the third mixture;
k. filtering the third mixture to obtain a third precipitate and a third filtrate;
l. suspending the third precipitate in a fourth aqueous alcoholic solution to obtain a fourth mixture;
m. filtering the fourth mixture to obtain a fourth precipitate and a fourth filtrate; and
n. drying the fourth filtrate to yield purified Rebaudioside C.

In another embodiment of the process, the first aqueous alcoholic solution in step (b) is an ethanol-water solution, with 75-99% ethanol.

In another embodiment of the process, the second aqueous alcoholic solution in step (f) is a methanol-water solution with 70-99% methanol.

In another embodiment of the process, the third aqueous alcoholic solution in step (i) is an ethanol-water solution with 10-99% ethanol.

In another embodiment of the process, the step (c) of inducing crystallization in the first mixture comprises adding high purity Rebaudioside A to promote crystallization; and whereby the first precipitate from the step (d) is highly purified Rebaudioside A.

In another embodiment of the process, the step (g) of inducing crystallization in the second mixture comprises adding high purity Stevioside to promote crystallization; and whereby the second precipitate from the step (h) is highly purified Stevioside.

In another embodiment of the process, the step (j) of inducing crystallization in the third mixture comprises adding high purity Rebaudioside A to promote crystallization; and whereby the third precipitate from the step (k) is a mixture of steviol glycosides mainly comprising Rebaudioside A and Rebaudioside C.

In another embodiment of the process, the fourth precipitate from the step (m) is highly purified Rebaudioside A.

In another embodiment of the process, the aqueous alcoholic solution comprises one or more organic solvents selected from the group consisting of methanol, ethanol, 1-propanol, and isopropanol.

In another embodiment of the process, the purified Rebaudioside C has a purity greater than 60% on a dry basis.

In another embodiment of the process, the purified Rebaudioside C has a purity greater than 80% on a dry basis.

In another embodiment of the process, the purified Rebaudioside C has a purity greater than about 95% on a dry basis.

In another embodiment, the process further comprises:

o. dissolving the dried fourth filtrate in a fifth aqueous alcoholic solution to obtain a fifth mixture;
p. inducing crystallization in the fifth mixture; and
q. filtering the fifth mixture to obtain a fifth precipitate and a fifth filtrate; whereby drying the fifth filtrate yields Rebaudioside C with purity greater than 90%.

In another embodiment of the process, the fifth aqueous alcoholic solution in step (o) is a methanol-water solution with 10-99% methanol content.

In another embodiment of the process, the step (p) of inducing crystallization in the fourth mixture comprises adding high purity Rebaudioside A to promote crystallization.

In another embodiment, the process further comprises:

r. dissolving the dried fifth filtrate in a sixth aqueous alcoholic solution to obtain a sixth mixture;
s. inducing crystallization in the sixth mixture; and
t. filtering the sixth mixture to obtain a sixth precipitate and a sixth filtrate; whereby drying the sixth precipitate yields Rebaudioside C with purity greater than 95% on dry basis.

In another embodiment, the process further comprises purifying the dried sixth precipitate by a chromatographic system.

Another aspect of the present invention provides a product comprising high purity Rebaudioside C, wherein the product is selected from the group consisting of food, beverage, pharmaceutical composition, tobacco, nutraceutical, oral hygienic composition, or cosmetic.

Another aspect of the present invention provides a sweetener composition comprising high purity Rebaudioside C.

In another embodiment, the sweetener composition further comprises Rebaudioside A, enzymatically modified *stevia*, Rebaudioside D, a mixture of steviol glycosides with more than 95% (on dry basis) total steviol glycosides content, high intensity sweetener and natural flavor compound, caloric sweetener, or sucrose.

In another embodiment, the sweetener composition further comprises one natural high intensity sweetener selected from the group consisting of: steviol glycosides including a purified sweet steviol glycoside mixture, stevioside, rebaudioside A, rebaudioside B, rebaudioside C, rebaudioside D, rebaudioside E, rebaudioside F, duleoside A, dulcoside B, rubusoside, *stevia*, alpha-glucosyl *stevia*, fructosyl *stevia*, galactosyl *stevia*, beta-glucosyl *stevia*; siamenoside; mogroside mogroside V; Luo Han Guo sweetener; monatin and its salts (monatin SS, RR, RS, SR); glycyrrhizic acid and its salts; curculin; thaumatin; monellin; mabinlin; brazzein; hernandulcin; phyllodulcin; glycyphyllin; phloridzin; trilobtain; baiyunoside; osladin; polypodoside A; pterocaryoside A; pterocaryoside B; mukurozioside; phlomisoside I; periandrin I; abrusoside A; cyclocarioside I; and combinations thereof.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

DETAILED DESCRIPTION OF THE INVENTION

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention provides a process for isolation and purification of rebaudioside C along with obtaining different by-products, which can be used as high intensity sweeteners as well.

In one embodiment of present invention, the process of the isolation and purification begins with providing *stevia* extract, containing 5-15%, preferably 9-11% (on dry basis) rebaudioside C. The *stevia* extract is admixed with a first aqueous alcoholic solution containing 70-100%, more preferably 90-99% alcohol to obtain a first mixture. The ratio (wt/vol) of extract to aqueous alcohol is 1:1 to 1:5, more preferably 1:2 to 1:4. The alcohol is selected from the group comprising ethanol, methanol, 1-propanol, 2-propanol or combinations thereof, more preferably ethanol and methanol.

In another embodiment the first mixture is incubated at a temperature 10-100° C. more preferably 30-80° C. for 0.5-30 min more preferably for 1-10 min.

In another embodiment the first mixture is then cooled to 0-40° C. preferably 10-30° C. and incubated at final temperature for 1-72 hours, preferably 1-24 hours.

In another embodiment the first mixture is admixed with high purity rebaudioside A crystals to facilitate the crystallization.

In another embodiment the crystallized rebaudioside A is separated from first mixture to become a first precipitate, and the remaining solution becomes a first filtrate.

In another embodiment the first precipitate has 50-99%, preferably 70-97% (on dry basis) rebaudioside A content.

In another embodiment the first filtrate is evaporated and dried by any suitable process known to art yielding the dried first filtrate with 10-40%, preferably 15-25% (on dry basis) rebaudioside C content.

In another embodiment the dried first filtrate is admixed with a second aqueous alcoholic solution containing 70-100%, more preferably 90-99% alcohol to obtain a second mixture. The ratio (wt/vol) of first dried filtrate to aqueous alcohol is 1:1 to 1:5, more preferably 1:2 to 1:4. The alcohol is selected from the group comprising ethanol, methanol, 1-propanol, 2-propanol or combinations thereof, more preferably ethanol and methanol.

In another embodiment the second mixture is incubated at a temperature 10-100° C. more preferably 40-80° C. for 0.5-30 min more preferably for 1-10 min.

In another embodiment the second mixture is then cooled to 0-40° C. preferably 10-30° C. and incubated at final temperature for 1-72 hours, preferably 12-48 hours.

In another embodiment the second mixture is admixed with high purity Stevioside crystals to facilitate the crystallization.

In another embodiment the crystallized Stevioside is separated from the second mixture to become a second precipitate, and the remaining solution becomes a second filtrate.

In another embodiment the second precipitate has 50-99%, preferably 70-95% (on dry basis) Stevioside content.

In another embodiment the second filtrate is further admixed with a third aqueous alcoholic solution containing 70-100%, more preferably 90-99% alcohol to obtain a third mixture. The ratio (vol/vol) of second filtrate to aqueous alcohol is 1:0 to 1:5, more preferably 1:0 to 1:2. The alcohol is selected from the group comprising ethanol, methanol, 1-propanol, 2-propanol or combinations thereof, more preferably ethanol and methanol.

In another embodiment the third mixture is admixed with high purity rebaudioside A crystals to facilitate the crystallization.

In another embodiment the third mixture is then incubated at 0-40° C. preferably 10-30° C. for 1-144 hours, preferably 24-72 hours.

In another embodiment the third mixture is separated into a third precipitate and a third filtrate, where the third precipitate is with 10-50%, preferably 15-40% (on dry basis) rebaudioside C and 50-90% preferably 60-85% (on dry basis) rebaudioside A content, and the third filtrate is further used to purify rebaudioside A and other steviosides.

In another embodiment the third precipitate is dried by any means known to art to provide dry crystalline powder.

In another embodiment the third precipitate is admixed with a fourth aqueous alcoholic solution containing 70-100%, more preferably 80-99% alcohol to obtain a fourth mixture. The ratio (wt/vol) of third precipitate to aqueous alcohol is 1:1 to 1:5, more preferably 1:2 to 1:4. The alcohol is selected from the group comprising ethanol, methanol, 1-propanol, 2-propanol or combinations thereof, more preferably ethanol and methanol.

In another embodiment the fourth mixture is incubated at a temperature 10-100° C. more preferably 20-50° C. for 1-192 hours more preferably for 2-120 hours.

In another embodiment the fourth mixture is then separated by any means known to art to obtain a fourth precipitate and a fourth filtrate.

In another embodiment the fourth precipitate is dried to provide crystalline powder with 90-99% preferably 95-98% (on dry basis) rebaudioside A content.

In another embodiment the fourth filtrate is dried to form dried fourth filtrate with 50-90% preferably 55-75% (on dry basis) rebaudioside C content.

In another embodiment the dried fourth filtrate is further admixed with a fifth aqueous alcoholic solution containing 70-100%, more preferably 90-99% alcohol to obtain a fifth mixture. The ratio (wt/vol) of dried fourth filtrate to aqueous alcohol is 1:1 to 1:5, more preferably 1:2 to 1:4. The alcohol is selected from the group comprising ethanol, methanol, 1-propanol, 2-propanol or combinations thereof, more preferably ethanol and methanol.

In another embodiment the fifth mixture is incubated at a temperature 0-100° C. more preferably 2-25° C. for 1-192 hours more preferably for 24-120 hours.

In another embodiment the fifth mixture is admixed with high purity rebaudioside A crystals to facilitate the further crystallization of residual Rebaudioside A.

In another embodiment the fifth mixture is separated by any means known in the art to obtain a fifth precipitate and a fifth filtrate, where the fifth precipitate is Rebaudioside A.

In another embodiment the fifth filtrate is dried to form dried fifth filtrate with 60-99%, preferably 75-95% (on dry basis) rebaudioside C content.

In another embodiment the dried fifth filtrate is further admixed with a sixth aqueous alcoholic solution containing 70-100%, more preferably 90-99% alcohol to obtain sixth mixture. The ratio (wt/vol) of dried fifth filtrate to aqueous alcohol is 1:1 to 1:5, more preferably 1:2 to 1:4. The alcohol is selected from the group comprising ethanol, methanol, 1-propanol, 2-propanol or combinations thereof, more preferably ethanol and methanol.

In another embodiment the sixth mixture is incubated at a temperature 0-100° C. more preferably 2-25° C. for 1-192 hours more preferably for 24-120 hours.

In another embodiment the sixth mixture is admixed with high purity rebaudioside C crystals to facilitate the crystallization.

In another embodiment the crystals are separated from sixth mixture to form a sixth precipitate with 90-99%, preferably 95-98% rebaudioside C.

In another embodiment a material obtained through different embodiments of this invention with greater than 50% rebaudioside C content is being subjected to chromatographic separation to provide a product with greater than 95% (on dry basis) rebaudioside C content. A chromatographic system comprising 1-16, preferably 1-3, chromatographic columns packed with activated carbon, bentonite, zeolite, modified silicagel, unmodified silicagel, ion exchange resins, polymeric adsorbents, more preferably unmodified silicagel and polymeric adsorbent (Diaion HP20 type) is loaded with starting material containing more than 50%, preferably more than 60% (on dry basis) rebaudioside C. The separation is carried out by mobile phase comprising ethyl acetate, 1-propanol, 2-prpopanol, acetone, ethanol, methanol, acetonitrile, water, preferably ethylacetate, 1-propanol, ethanol and water with content of ethyl acetate 0-100% (vol.) preferably 60-95% (vol.), 1-propanol 0-40%, preferably 5-30% (vol.), ethanol 0-95% (vol.) preferably 1-15%, and water 0-90% (vol.) preferably 2-20% (vol.). Any other chromatographic system such as simulated moving bed (SMB) and media known to those skilled in art can be used to conduct this separation.

The HPLC analysis of steviol glycosides was carried out using an Agilent Technologies 1200 Series (USA) equipped with Zorbax-$NH_2$ column (4.6×250 mm, 5 um) using acetonitrile-water 80:20, (v/v) mobile phase and UV detector at 210 nm as described in FAO JECFA Monographs 5 (2008).

The obtained compositions can be used as sweetness enhancer, flavor enhancer and sweetener in various food and beverage products. Non-limiting examples of food and beverage products include carbonated soft drinks, ready to drink beverages, energy drinks, isotonic drinks, low-calorie drinks, zero-calorie drinks, sports drinks, teas, fruit and vegetable juices, juice drinks, dairy drinks, yoghurt drinks, alcohol beverages, powdered beverages, bakery products, cookies, biscuits, baking mixes, cereals, confectioneries, candies, toffees, chewing gum, dairy products, flavored milk, yoghurts, flavored yoghurts, cultured milk, soy sauce and other soy base products, salad dressings, mayonnaise, vinegar, frozen-desserts, meat products, fish-meat products, bottled and canned foods, tabletop sweeteners, fruits and vegetables.

Additionally the compositions can be used in drug or pharmaceutical preparations and cosmetics, including but not limited to toothpaste, mouthwash, cough syrup, chewable tablets, lozenges, vitamin preparations, and the like.

The compositions can be used "as-is" or in combination with other sweeteners, flavors and food ingredients.

Non-limiting examples of sweeteners include steviol glycosides, stevioside, rebaudioside A, rebaudioside B, rebaudioside C, rebaudioside D, rebaudioside E, rebaudioside F, dulcoside A, steviolbioside, rubusoside, as well as other steviol glycosides found in Stevia rebaudiana Bertoni plant and mixtures thereof, stevia extract, Luo Han Guo extract, mogrosides, high-fructose corn syrup, corn syrup, invert sugar, fructooligosaccharides, inulin, inulooligosaccharides, coupling sugar, maltooligosaccharides, maltodextins, corn syrup solids, glucose, maltose, sucrose, lactose, aspartame, saccharin, sucralose, sugar alcohols.

Non-limiting examples of flavors include lemon, orange, fruity, banana, grape, pear, pineapple, bitter almond, cola, cinnamon, sugar, cotton candy, vanilla flavors.

Non-limiting examples of other food ingredients include flavors, acidulants, organic and amino acids, coloring agents, bulking agents, modified starches, gums, texturizers, preservatives, antioxidants, emulsifiers, stabilisers, thickeners, gelling agents.

The following examples illustrate preferred embodiments of the invention.

Example 1

Preparation of Rebaudioside C 10 kg of stevia extract containing 10.1% (on dry basis) rebaudioside C was dissolved in 30 liters of 95% ethanol at 40° C. and cooled to 20° C. 5 g of highly purified rebaudioside A crystals were added as starter and the mixture was further incubated for 2 hours. The crystals of rebaudioside A (with 95.4% (on dry basis) rebaudioside A content) were separated and the filtrate was dried to obtain 4.9 kg powder with 20.1% rebaudioside C content. The powder was dissolved in 15 liters of 90% methanol solution at 45° C. and cooled to 20° C. 2 g of highly purified Stevioside was added as a starter and the mixture was incubated for 48 hrs. Then the mixture was filtered to obtain 15 liters of filtrate and 4.8 kg of wet crystals. The filtrate was mixed with 15 liters of ethanol and seeded with 2 g of high purity rebaudiside A as a starter. Then it was incubated for 24 hours at 10° C. for crystallization. Precipitated crystals were separated and dried to result in 0.25 kg of dry powder with 39.8% rebaudioside C content. The crystals were suspended in 0.5 liters of 80% ethanol solution and incubated at 35° C. for 2 hours. After incubation the crystals were separated and dried to yield 111.3 g of rebaudioside A with 97.1% purity. The filtrate was dried to obtain 138 g powder with 70.9% rebaudioside C content.

Example 2

Purification of Rebaudioside C 100 g of rebaudioside C prepared as per EXAMPLE 1 with 70.9% rebaudioside C content was dissolved in 200 mL of 90% methanol at 50° C. and cooled down to 10° C. 0.5 g of high purity rebaudioside A was added and the mixture was incubated at 10° C. for 24 hours. The mixture was filtered to separate the crystals. The crystals were dried to yield 19.1 g of Rebaudioside A with 97.3% purity. The filtrate was dried to yield 80.7 g of rebaudioside C with 87.6% purity.

Example 3

Refining of Rebaudioside C by Re-Crystallization 100 g of rebaudioside C prepared as per EXAMPLE 2 was dissolved in 200 mL of 99% Methanol at 50° C. and cooled down to 5° C. 1 g of highly purified rebaudioside C was added as starter and the mixture was incubated at 5° C. for 24 hours. The crystals were separated by filtration and dried under vacuum at 55° C. to yield 80.3 g of rebaudioside C with 98.1% purity.

Example 4

Refining of Rebaudioside C by Chromatography 10 g of rebaudioside C prepared according to EXAMPLE 2 was dissolved in 20 mL of solvent comprising ethylacetate, n-propanol, ethanol and water with 7:2:0.5:0.5 ratio. A glass column (60×2.5 cm) packed with Kieselgel 60 (Merck, Germany) was equilibrated with mobile phase comprising ethylacetate, n-propanol, ethanol and water with 7:2:0.5:0.5 ratio and the sample was passed through the column at SV=1.0 hr$^{-1}$. The fractions with high rebaudioside C content were combined and dried to yield 7.5 g of rebaudioside C with 98.0% purity.

Example 5

Low-Calorie Orange Juice Drink

Orange concentrate (35%), citric acid (0.38%), ascorbic acid (0.05%), sodium benzoate (0.02%), orange red color (0.01%), orange flavor (0.20%), and sweetener (as per Table 1) were blended and dissolved completely in the water (up to 100%) and pasteurized. The sensory evaluation of the samples by 10 panelists is summarized in Table 1.

TABLE 1

| Sample (sweetener) | Comments | | |
|---|---|---|---|
| | Flavor | Aftertaste | Mouth feel |
| Sucrose 5% | Sweet and balanced flavor | Clean taste, no aftertaste | Full |
| Rebaudioside A 250 ppm | Sweet, rounded and balanced flavor | Slight bitter aftertaste | Acceptable |
| Rebaudioside A 100 ppm and Rebaudioside C 50 ppm | Pleasant sucrose-like sweetness, balanced flavor | Clean taste, no aftertaste | Full |

Similarly juices from other fruits, such as apple, lemon, apricot, cherry, pineapple, etc. can be prepared.

Example 6

Low-Calorie Carbonated Drink

Carbonated beverage samples with following composition (Table 2) utilizing different sweeteners were prepared.

TABLE 2

| Ingredients | Quantity, % |
|---|---|
| Cola flavor | 0.340 |
| Phosphoric acid (85%) | 0.100 |
| Sodium citrate | 0.310 |
| Sodium benzoate | 0.018 |
| Citric acid | 0.018 |
| Sweetener | see Table 3 |
| Sucrose | 6.0% |
| Carbonated water | to 100 |

The samples with different sweeteners were evaluated by 10 panelists. Evaluation results are summarized in TABLE 3.

TABLE 3

| Sensory attribute, (number of panelists) | Sweetener in sample (see Table 2) | | |
|---|---|---|---|
| | Sucrose 6% | Reb A 250 ppm | Reb A 100 ppm and Reb C 50 ppm |
| Bitter taste | 0 | 3 of 10 panelists | 0 |
| Astringent taste | 0 | 2 of 10 panelists | 0 |
| Aftertaste | 0 | 2 of 10 panelists | 1 of 10 panelists |
| Quality of sweetness | Clean | Clean (6 of 10 panelists) | Clean (9 of 10 panelists) |
| Overall evaluation | Satisfactory (10 of 10 panelists) | Satisfactory (8 of 10 panelists) | Satisfactory (9 of 10 panelists) |

The above results show that the beverages prepared using highly purified Rebaudioside A and Rebaudioside C possess good organoleptic characteristics.

REFERENCES

Kobayashi, M., Horikawa, S., Dergandi, L H., Ueno, J., and Mitsuhashi, H. Dulcoside A and B, New diterpene glycosides from *Stevia rebaudiana*. Phytochemistry. 1977. V. 16. 1405-1408.

Sakamoto I., Yamasaki K., and Tanaka O. Application of $^{13}$C NMR Spectroscopy to Chemistry of Natural Glycosides: Rebaudioside-C, a New Sweet Diterpene Glycoside of *Stevia rebaudiana*. Chem. Pharm. Bull. 1977. V. 25(4). 844-846.

I claim:

1. A process for purifying Rebaudioside C from *Stevia* extract comprising the steps of:
    a. providing an extract of *Stevia rebaudiana* Bertoni plant;
    b. dissolving the extract in a first aqueous alcoholic solution to obtain a first mixture, wherein the first aqueous alcoholic solution is an ethanol-water solution, with 75-99% ethanol;
    c. inducing crystallization in the first mixture;
    d. filtering the first mixture to obtain a first precipitate and a first filtrate;
    e. drying the first filtrate;
    f. dissolving the dried first filtrate in a second aqueous alcoholic solution to obtain a second mixture, wherein the second aqueous alcoholic solution is a methanol-water solution with 70-99% methanol;
    g. inducing crystallization in the second mixture;
    h. filtering the second mixture to obtain a second precipitate and a second filtrate;
    i. adding a third aqueous alcoholic solution into the second filtrate to obtain a third mixture, wherein the third aqueous alcoholic solution is an ethanol-water solution with 10-99% ethanol;
    j. inducing crystallization in the third mixture;
    k. filtering the third mixture to obtain a third precipitate and a third filtrate;
    l. suspending the third precipitate in a fourth aqueous alcoholic solution to obtain a fourth mixture, wherein the fourth aqueous alcoholic solution is an ethanol-water solution with 80-99% ethanol;
    m. filtering the fourth mixture to obtain a fourth precipitate and a fourth filtrate; and
    n. drying the fourth filtrate to yield purified Rebaudioside C.

2. The process of claim 1, wherein the step (c) of inducing crystallization in the first mixture comprises adding high purity Rebaudioside A to promote crystallization; and whereby the first precipitate from the step (d) is highly purified Rebaudioside A.

3. The process of claim 1, wherein the step (g) of inducing crystallization in the second mixture comprises adding high purity Stevioside to promote crystallization; and whereby the second precipitate from the step (h) is highly purified Stevioside.

4. The process of claim 1, wherein the step (j) of inducing crystallization in the third mixture comprises adding high purity Rebaudioside A to promote crystallization; and whereby the third precipitate from the step (k) is a mixture of steviol glycosides mainly comprising Rebaudioside A and Rebaudioside C.

5. The process of claim 1, wherein the fourth precipitate from the step (m) is highly purified Rebaudioside A.

6. The process of claim 1, wherein the purified Rebaudioside C has a purity greater than 60% on a dry basis.

7. The process of claim 1, wherein the purified Rebaudioside C has a purity greater than 80% on a dry basis.

8. The process of claim 1, wherein the purified Rebaudioside C has a purity greater than about 95% on a dry basis.

9. A product comprising high purity Rebaudioside C of claim 1, wherein the product is selected from the group consisting of: food, beverage, pharmaceutical composition, tobacco, nutraceutical, oral hygienic composition, Or cosmetic.

10. The process of claim 1, further comprising:
o. dissolving the dried fourth filtrate in a fifth aqueous alcoholic solution to obtain a fifth mixture;
p. inducing crystallization in the fifth mixture; and
q. filtering the fifth mixture to obtain a fifth precipitate and a fifth filtrate;
whereby drying the fifth filtrate yields Rebaudioside C with purity greater than 90%.

11. The process of claim 10, wherein the fifth aqueous alcoholic solution in step (o) is a methanol-water solution with 10-99% methanol content.

12. The process of claim 10, wherein the step (p) of inducing crystallization in the fourth mixture comprises adding high purity Rebaudioside A to promote crystallization.

13. The process of claim 10, further comprising:
r. dissolving the dried fifth filtrate in a sixth aqueous alcoholic solution to obtain a sixth mixture;
s. inducing crystallization in the sixth mixture; and
t. filtering the sixth mixture to obtain a sixth precipitate and a sixth filtrate;
whereby drying the sixth precipitate yields Rebaudioside C with purity greater than 95% on dry basis.

14. The process of claim 13, further comprising purifying the dried sixth precipitate by a chromatographic system.

15. A sweetener composition comprising high purity Rebaudioside C of claim 1.

16. The sweetener composition of claim 15, further comprising Rebaudioside A, enzymatically modified *stevia*, Rebaudioside D, a mixture of steviol glycosides with more than 95% (on dry basis) total steviol glycosides content, high intensity sweetener and natural flavor compound, caloric sweetener, or sucrose.

17. The sweetener composition of claim 15, further comprising one natural high intensity sweetener selected from the group consisting of: steviol glycosides including a purified sweet steviol glycoside mixture, stevioside, rebaudioside A, rebaudioside B, rebaudioside C, rebaudioside D, rebaudioside E, rebaudioside F, dulcoside A, dulcoside B, rubusoside, *stevia*, alpha-glucosyl *stevia*, fructosyl *stevia*, galactosyl *stevia*, beta-glucosyl *stevia*; siamenoside; mogroside IV; mogroside V; Luo Han Guo sweetener; monatin and its salts (monatin SS, RR, RS, SR); glycyrrhizic acid and its salts; curculin; thaumatin; monellin; mabinlin; brazzein; hernandulcin; phyllodulcin; glycyphyllin; phloridzin; trilobtain; baiyunoside; osladin; polypodoside A; pterocaryoside A; pterocaryoside B; mukurozioside; phlomisoside I; periandrin I; abrusoside A; cyclocarioside I; and combinations thereof.

* * * * *